(12) United States Patent
Nakanishi et al.

(10) Patent No.: US 7,157,164 B2
(45) Date of Patent: Jan. 2, 2007

(54) FUEL CELL SYSTEM AND CONTROL METHOD OF THE SAME

(75) Inventors: Haruyuki Nakanishi, Susono (JP); Shinichi Matsumoto, Fuji (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 384 days.

(21) Appl. No.: 10/412,207

(22) Filed: Apr. 14, 2003

(65) Prior Publication Data

US 2003/0198845 A1    Oct. 23, 2003

(30) Foreign Application Priority Data

Apr. 19, 2002   (JP)   ............................. 2002-116950

(51) Int. Cl.
  *H01M 8/00*    (2006.01)
  *H01M 8/04*    (2006.01)
  *H01M 8/12*    (2006.01)
(52) U.S. Cl. .............................. 429/12; 429/22; 429/34
(58) Field of Classification Search ...................... None
  See application file for complete search history.

(56) References Cited

U.S. PATENT DOCUMENTS 4,310,605 A * 1/1982 Early et al. .................... 429/18
4,393,123 A * 7/1983 Lambrech ..................... 429/24
5,260,143 A * 11/1993 Voss et al. .................... 429/13

FOREIGN PATENT DOCUMENTS

| EP | 1 164 048 A2 | 12/2001 |
|---|---|---|
| JP | 9-139221 A | 5/1997 |
| JP | 09139221 A | 5/1997 |
| JP | 9-312168 A | 12/1997 |
| JP | 09312168 A | 12/1997 |
| JP | 2001-332281 A | 11/2001 |

* cited by examiner

*Primary Examiner*—Patrick Joseph Ryan
*Assistant Examiner*—Julian Mercado
(74) *Attorney, Agent, or Firm*—Kenyon & Kenyon LLP

(57) ABSTRACT

A fuel cell system in which fuel gas and oxidizing gas are supplied to a fuel cell stack and power generation is performed by electrochemical reaction between the fuel gas and the oxidizing gas, and a control method thereof are provided. This fuel cell system includes a fuel gas supply manifold which is extended in a unit cell stacking direction and which distributes the fuel gas to a fuel gas passage; a switching device which is provided inside the fuel gas supply manifold, and which switches between permission and prohibition of distribution of the fuel gas to the fuel gas passage of each of the unit cells; a load disconnect device which disconnects an output terminal of the stack from a load; a short-circuit device which short-circuits a positive electrode and a negative electrode of the output terminal of the stack; and a control device which short-circuits the positive electrode and the negative electrode of the output terminal by the short-circuit device after distribution of the fuel gas to the fuel gas passage of each of the unit cells is prohibited by the switching device when the output terminal is disconnected from the load by the load disconnect device.

18 Claims, 5 Drawing Sheets

FUEL CELL SYSTEM AND CONTROL METHOD OF THE SAME

INCORPORATION BY REFERENCE

The disclosure of Japanese Patent Application No. 2002-116950 filed on Apr. 19, 2002, including the specification, drawings and abstract is incorporated herein by reference in its entirety.

BACKGROUND OF THE INVENTION

1. Field of the Invention

The invention relates to a fuel cell system and a control method thereof.

2. Description of the Related Art

A fuel cell stack is formed by stacking a plurality of unit cells. Each of the unit cells is configured such that a membrane electrode assembly (hereinafter, referred to as MEA) is sandwiched by two separators. The MEA is formed from an electrolyte membrane in which platinum as a catalytic electrode is applied to both surfaces thereof, and a pair of gas diffusion electrodes which sandwich the electrolyte membrane. The catalytic electrode and the gas diffusion electrode on one surface of the electrolyte membrane form an anode, and the catalytic electrode and the gas diffusion electrode on the other surface form a cathode. A fuel gas passage through which hydrogen gas as fuel gas is distributed to a unit cell is formed in the separator that faces the anode, and an oxidizing gas passage through which air as oxidizing gas is distributed to the unit cell is formed in a separator that faces the cathode. Also, based on the fact that the electrolyte membrane normally exhibits good proton conductivity in a humid state, fuel gas and oxidizing gas are supplied after being humidified such that the electrolyte membrane is maintained to be humid.

In a fuel cell stack of this type, when a circuit which connects an output terminal of a fuel cell and a load is opened, a phenomenon in which the hydrogen gas on the anode side passes through the electrolyte membrane and reaches the cathode side as it is without being protonated, that is, so-called cross leak is caused. As a result, there is a possibility that sufficient durability cannot be obtained due to the cross leak of the hydrogen gas. For example, when the amount of the cross-leaked hydrogen gas is large, hydrogen directly reacts with oxygen on the cathode side, which generates a large amount of heat, and the electrolyte membrane is damaged due to the heat. As a result, there is a possibility that sufficient durability cannot be obtained. Therefore, in order to prevent such cross leak of the hydrogen gas, a method is conceivable, in which the hydrogen gas that remains in each of the unit cells is consumed by short-circuiting a positive electrode and a negative electrode of the output terminal after the supply of the fuel gas is stopped.

However, normally, distribution of the fuel gas to each of the unit cells is configured such that the fuel gas is supplied from a fuel gas supply source to a fuel gas supply manifold of the fuel cell stack through gas piping, and the fuel gas is distributed from the manifold to each of the unit cells. Also, since interruption of the supply of the fuel gas is configured to be performed by a valve or the like which is provided in the gas piping, a considerable amount of the fuel gas remains in the gas piping and the manifold after the supply of the gas is interrupted. When the positive electrode and the negative electrode of the output terminal are short-circuited in this state, a large amount of heat is generated. Accordingly, there still exists a problem concerning durability. Also, there is another problem that it becomes difficult to obtain good fuel economy, which is supposed to be obtained, since a large amount of fuel gas is unnecessarily consumed.

A configuration in which a positive electrode and a negative electrode of an output terminal are short-circuited when operation of a fuel cell is stopped is disclosed in Japanese Patent Laid-Open Publication No. 9-139221. However, an object thereof is to eliminate residual voltage so as to prevent electric shock which is caused during a checkup after the operation. Accordingly, prevention of the cross leak of hydrogen gas, and the fuel economy are not considered.

SUMMARY OF THE INVENTION

The invention is made in consideration of the above-described problem. It is an object of the invention to provide a fuel cell system in which cross leak can be prevented when an output terminal of a stack is disconnected from a load, and a control method thereof. Also, it is another object of the invention to provide a fuel cell system in which deterioration of fuel economy can be prevented when cross leak is prevented, and a control method thereof.

According to an exemplary embodiment of the invention, a fuel cell system in which fuel gas and oxidizing gas are supplied to a fuel cell stack that is formed by stacking a plurality of unit cells, and power generation is performed by electrochemical reaction between the fuel gas and the oxidizing gas is provided. This system includes a fuel gas supply manifold which is extended in the unit cell stacking direction and which distributes fuel gas to a fuel gas passage of each of the unit cells, a switching device which is provided inside the fuel gas supply manifold and which switches between permission and prohibition of distribution of the fuel gas to the fuel gas passage of each of the unit cells, a load disconnect device which disconnects the output terminal of the stack from the load, a short-circuit device which short-circuits the positive electrode and the negative electrode of the output terminal of the stack, and a control device which short-circuits the positive electrode and the negative electrode of the output terminal by the short-circuit device after distribution of the fuel gas to the fuel gas passage of each of the unit cells is prohibited by the switching device when the output terminal is disconnected from the load by the load disconnect device.

In a fuel cell system with such a configuration, when the output terminal of the fuel cell stack is disconnected from the load, the hydrogen in each of the unit cells is consumed by short-circuiting the positive electrode and the negative electrode of the output terminal of the stack after distribution of the fuel gas to the fuel gas passage is prohibited in the fuel gas supply manifold. Accordingly, cross leak of hydrogen can be prevented. Also, distribution of the fuel gas is stopped in the fuel gas supply manifold, unlike a conventional method in which the supply of the fuel gas is stopped in gas piping which is provided outside the stack. Accordingly, the amount of the hydrogen which remains after distribution of the fuel gas is stopped is smaller, the amount of the hydrogen which is consumed when the positive electrode and the negative electrode of the output terminal are short-circuited is smaller, and the amount of heat generation is smaller, as compared with the conventional method. Accordingly, deterioration of durability due to heat generated at the time of short-circuit can be suppressed, and unnecessary consumption of large amount of hydrogen can be avoided. Therefore, according to this fuel cell system, cross leak can be prevented when the output terminal of the stack is disconnected from the load, and deterioration of fuel economy can be avoided.

Also, according to another exemplary embodiment of the invention, a control method of a fuel cell system in which fuel gas and oxidizing gas are supplied to a fuel cell stack that is formed by stacking a plurality of unit cells, and power generation is performed by electrochemical reaction between the fuel gas and the oxidizing gas is provided. This control method includes the following steps of:

prohibiting distribution of the fuel gas to the fuel gas passage of each of the unit cells in the fuel gas supply manifold which is extended in the unit cell stacking direction when the output terminal of the stack is disconnected from the load, and short-circuiting the positive electrode and the negative electrode of the output terminal after distribution of the fuel gas is prohibited.

According to the method, when the output terminal of the fuel cell stack is disconnected from the load, the hydrogen in each of the unit cells is consumed by short-circuiting the positive electrode and the negative electrode of the output terminal of the stack after distribution of the fuel gas to the fuel gas passage of each of the unit cells is prohibited in the fuel gas supply manifold. Accordingly, cross leak of the hydrogen can be prevented. Also, distribution of the fuel gas is stopped in the fuel gas supply manifold, unlike the conventional method in which the supply of the fuel gas is stopped in gas piping which is provided outside the stack. Accordingly, the amount of the hydrogen which remains after distribution of the fuel gas is stopped is smaller, the amount of the hydrogen which is consumed when the positive electrode and the negative electrode of the output terminal are short-circuited is smaller, and an amount of heat generation is smaller, as compared with the conventional method. Accordingly, deterioration of durability due to heat generated at the time of short-circuit can be suppressed, and unnecessary consumption of large amount of hydrogen can be avoided. Therefore, according to the control method of the fuel cell, cross can be prevented when the output terminal of the stack is disconnected from the load, and deterioration of fuel economy can be avoided.

BRIEF DESCRIPTION OF THE DRAWINGS

The above-mentioned and other objects, features, advantages, technical and industrial significances of this invention will be better understood by reading the following detailed description of the exemplary embodiments of the invention, when considered in connection with the accompanying drawings, in which.

DESCRIPTION OF THE EXEMPLARY EMBODIMENTS

Figure 1:
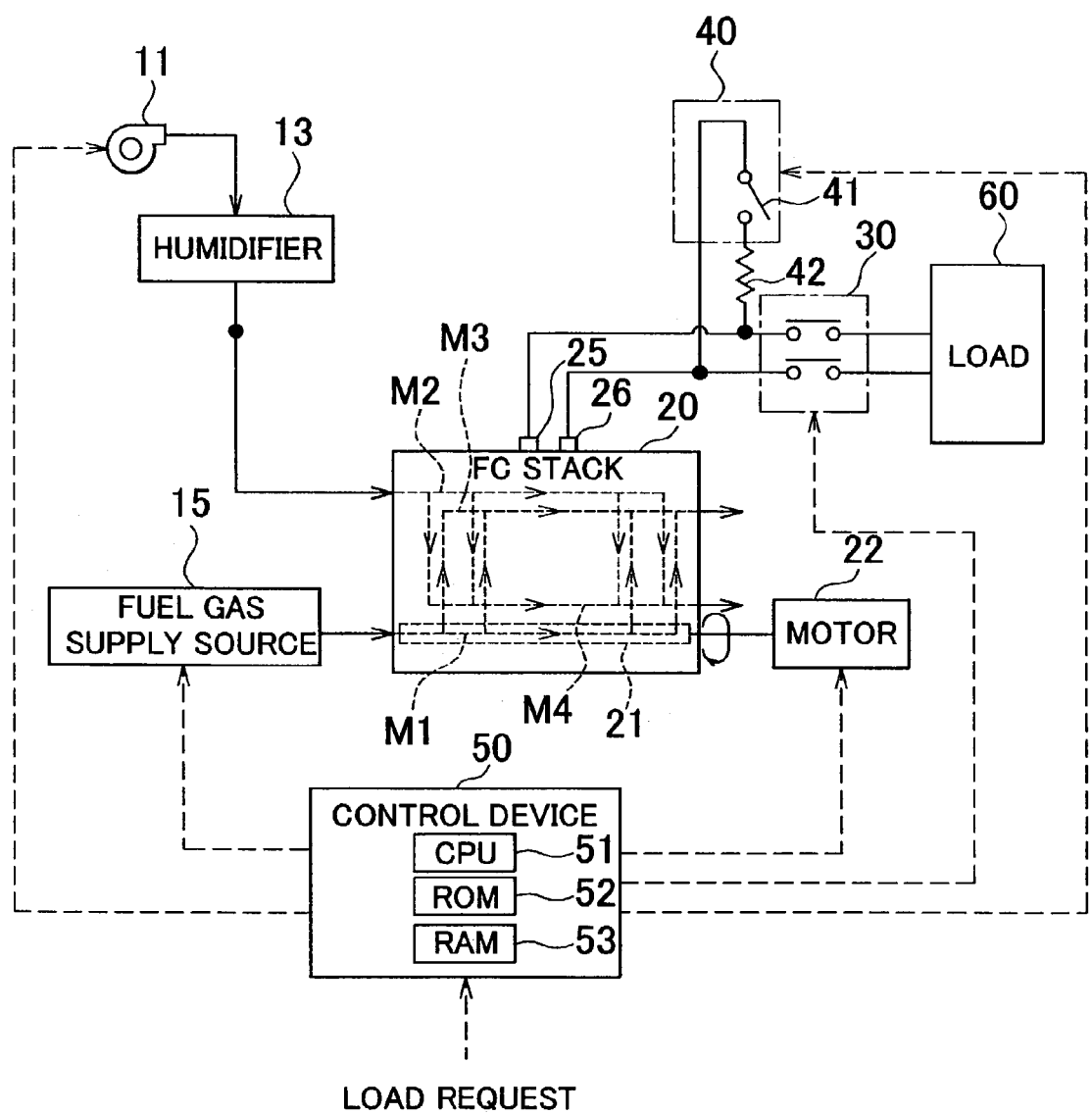
FIG. 1 is a block diagram schematically showing a fuel cell system according to an exemplary embodiment of the invention.
Figure 2:
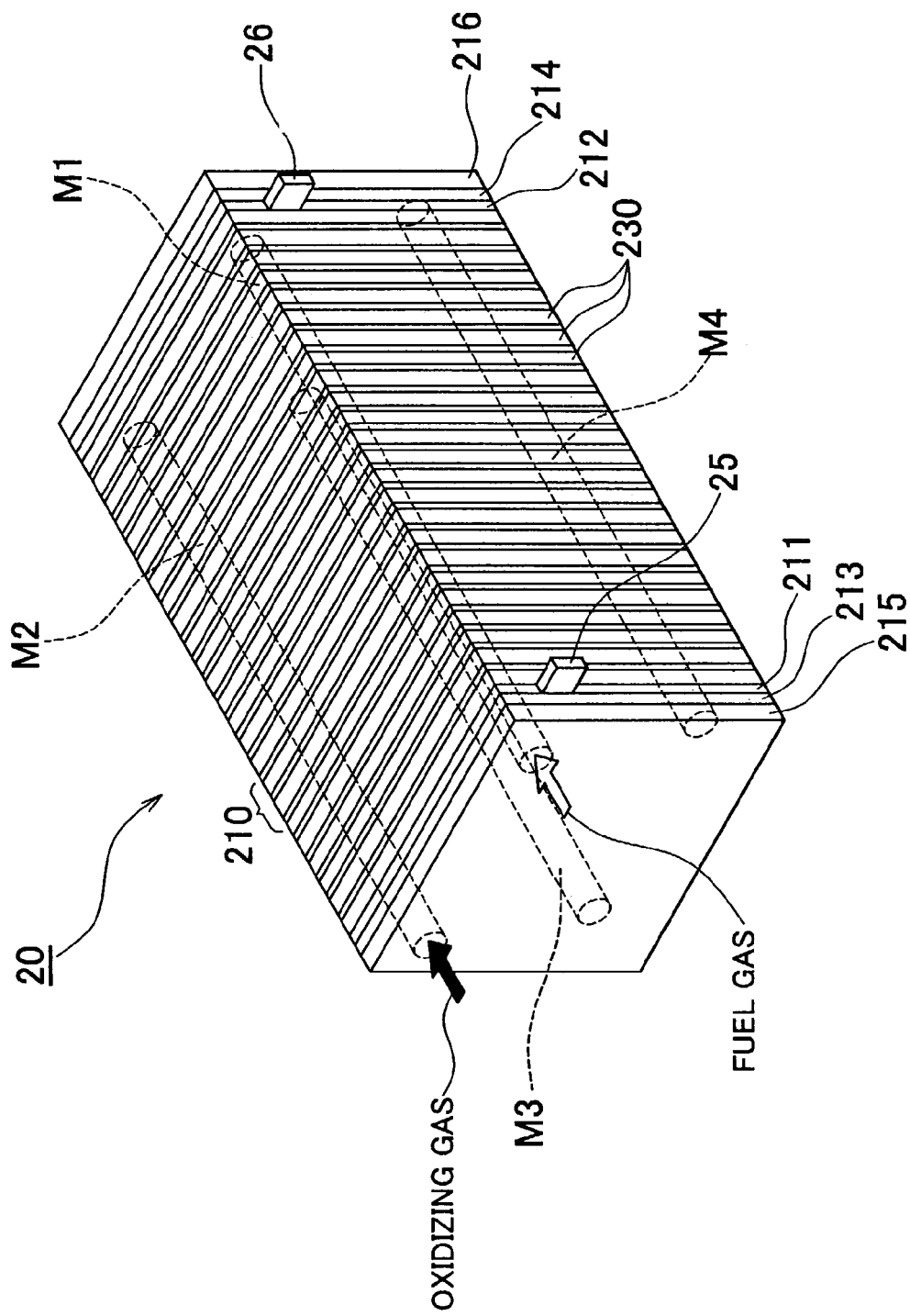
FIG. 2 is a perspective view of an FC stack of the fuel cell system according to the embodiment.
Figure 3:
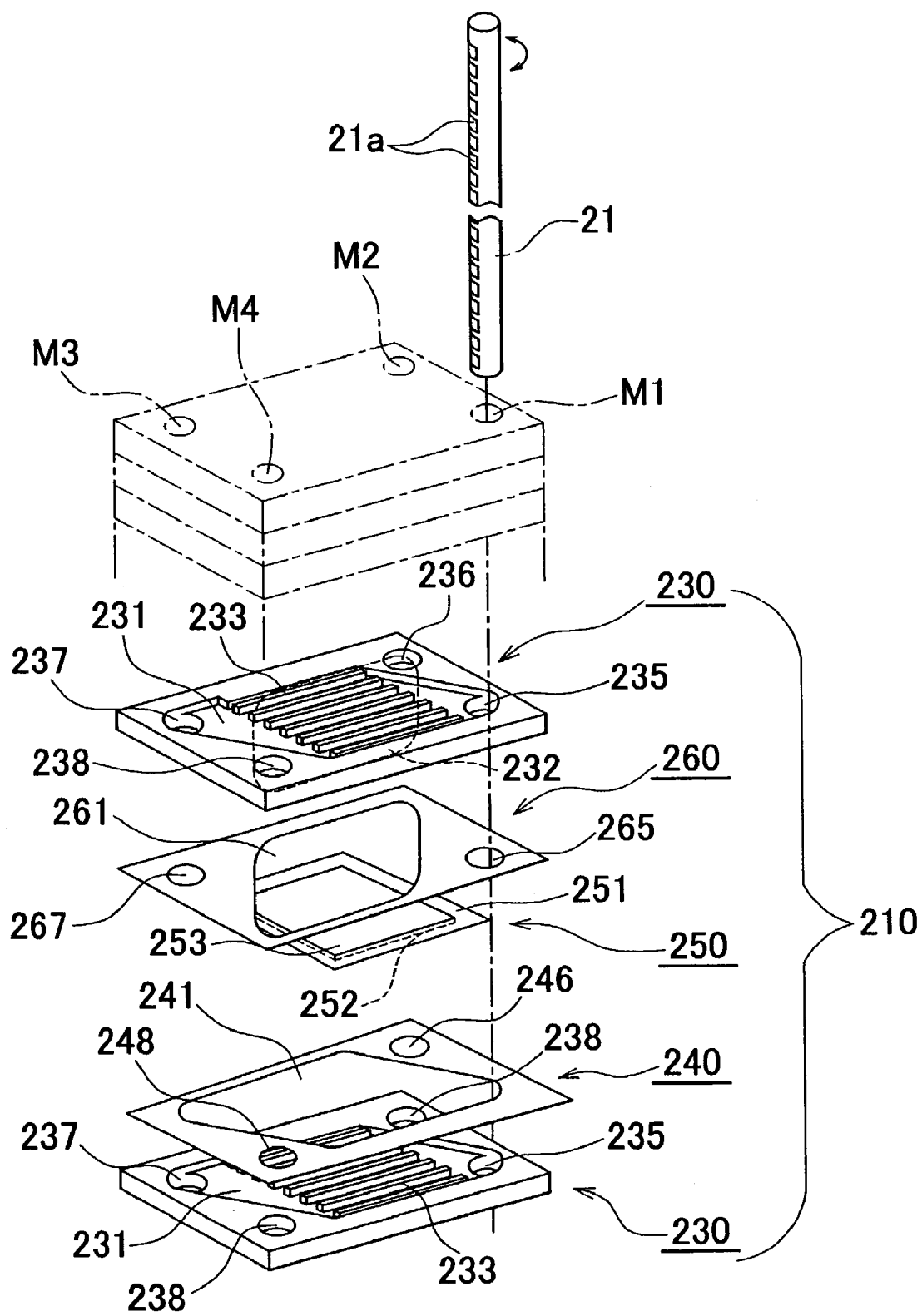
FIG. 3 is an exploded perspective view of a unit cell shown in FIG. 2.

In order to further clarify the invention, hereafter, an exemplary embodiment of the invention will be described with reference to accompanying drawings. FIG. 1 is a block diagram schematically showing a fuel cell system 10 according to the embodiment, FIG. 2 is a perspective view of an FC stack 20, and FIG. 3 is an exploded perspective view of a unit cell 210.

The fuel cell system 10 according to the embodiment mainly includes a fuel cell stack (hereinafter, referred to as an FC stack) 20 of a solid polyelectrolyte type, a first interrupter 30 which is provided between output terminals 25, 26 of the FC stack 20 and a load 60, a second interrupter 40 which is provided between the output terminals 25, 26 of the FC stack 20, and a control device 50 which controls a supply of fuel gas and oxidizing gas to the FC stack 20 and controls connection and disconnection by the first interrupter 30 and the second interrupter 40.

The FC stack 20, which will be described later in detail, is formed by stacking a plurality of unit cells 210. In the FC cell 20, the fuel gas is supplied from a fuel gas supply source 15 to a fuel gas supply manifold M1, and the fuel gas which passes through each of the unit cells 210 is released to the outside from a fuel gas release manifold M3. Also, the oxidizing gas which is humidified by a humidifier 13 is supplied from a blower 11 that is an oxidizing gas supply source to an oxidizing gas supply manifold M2, and the oxidizing gas which passes through each of the unit cells 210 is released to the outside from an oxidizing gas supply manifold M4. In this case, the fuel gas is gas which is rich in hydrogen, and the oxidizing gas is air (including oxygen). Since an electrochemical reaction occurs between the oxygen in the oxygen gas and the hydrogen in the fuel gas which are supplied to the FC stack 20 when the oxygen and hydrogen pass through each of the unit cells 210, the FC stack 20 generates electric power, and a potential difference is generated between the output terminals 25, 26. Examples of the fuel gas supply source 15 are a reformer which generates hydrogen gas from hydrocarbon type fuel (methanol, methane, propane, gasoline, or the like), a high-pressure hydrogen gas cylinder, a hydrogen absorbing alloy, or the like.

Also, inside the FC stack 20, a cylindrical valve 21 is extended in the direction of stacking the unit cell 210. The cylindrical valve 21, which will be described later in detail, functions as the fuel gas supply manifold M1 which distributes the fuel gas to each of the unit cells 210, and functions as the switching means for permitting or prohibiting distribution of the fuel gas to each of the unit cells 210. When the cylindrical valve 21 is rotated around the axis by the motor 22 and is positioned at a permission position for permitting distribution of the fuel gas to each of the unit cells 210, the cylindrical valve 21 permits distribution of the fuel gas to each of the unit cells 210. Meanwhile, when the cylindrical valve 21 is positioned at a prohibition position for prohibiting distribution of the fuel gas, the cylindrical valve 21 prohibits distribution of the fuel gas to each of the unit cells 210.

The first interrupter 30 connects the output terminals 25, 26 of the FC stack 20 with the load 60, or disconnects the output terminals 25, 26 from the load 60 depending on excitation or non-excitation of a solenoid (not shown). An example of the load 60 is a traction motor with an inverter, for example, in the case of an electric vehicle.

In the second interrupter 40, a short circuiting switch 41 short-circuits or does not short-circuit the output terminals 25, 26 of the FC stack 20 through a resistor 42 depending on excitation or non-excitation of a solenoid (not shown).

The control device 50 is formed as a microprocessor in which a CPU 51 is a central portion. In addition to the CPU 51, the control device 50 includes ROM 52 which stores various programs, RAM 53 which temporarily stores data, an input port (not shown), an output port (not shown), and a communication port (not shown). A load request signal is input into the control device 50 from another control unit (not shown) through the input port. Also, a driving signal to the blower 11, the fuel gas supply source 15, a motor 22 or the like, and a switching control signal to the first interrupter 30, the second interrupter 40, or the like are output from the control device 50 through the output port.

Next, the FC stack 20 will be described. The FC stack 20 is formed by stacking a plurality of unit cells 210, and then by sequentially arranging current collecting plates 211, 212, insulating plates 213, 214, and end plates 215, 216 on both ends of the stack, as shown in FIG. 2. Each of the current collecting plates 211, 212 is formed of a gas impermeable conductive member such as a dense carbon, or a steel plate, each of the insulating plates 213, 214 is formed of an insulative member such as rubber, or resin, and each of the end plates 215, 216 is formed of a metal such as steel with rigidity. The output terminals 25, 26 are provided on the current collecting plates 211, 212 respectively. One of the output terminals 25, 26 is the positive electrode, and the other is the negative electrode. Also, the end plates 215, 216 apply pressure to the FC stack 20 in the unit cell stacking direction by a pressure device (not shown) so as to support the FC stack 20.

The unit cell 210 is formed by stacking a separator 230, a first seal member 240, an MEA 250, a second seal member 260, and a separator 230 sequentially in this order, as shown in FIG. 3.

The MEA 250 is a membrane electrode assembly in which an electrolyte membrane 251 is sandwiched by an anode 252 and a cathode 253. In this case, the electrolyte membrane 251 is an ion-exchange membrane (for example, a Nafion membrane manufactured by Dupont) of a proton conductive type which is formed of a solid polymeric material such as fluorocarbon resin, and exhibits good proton conductivity in the humid state. On both surfaces of the electrolyte membrane 251, catalytic electrodes are formed by applying platinum or an alloy of platinum and another metal on both surfaces of the electrolyte membrane 251. Outside the electrolyte membrane, a pair of gas diffusion electrodes which are formed of carbon cloth that is woven from thread formed of carbon fiber is provided. The catalytic electrode and the gas diffusion electrode on one surface form the anode 252, and the catalytic electrode and the gas diffusion electrode on the other surface form the cathode 253.

The separator 230 is formed from a gas impermeable conductive member such as a formed carbon which is formed by compressing a carbon such that the carbon becomes gas impermeable. In this separator 230, a first concave portion 231 is provided on a surface which faces the anode 252 of the MEA 250, and a fuel gas passage 233 through which the fuel gas passes is formed in the first concave portion 231. Also, a second concave portion 232 is provided on a surface which faces the cathode 253 of the MEA 250, and an oxidizing gas passage (not shown) through which oxidizing gas passes is formed in the second concave portion 232. First to fourth through holes 235 to 238 are provided on four corners of the separator 230 respectively.

The first through hole 235 and the third through hole 237 which are arranged on one diagonal line are provided in an area that is inside the first concave portion 231 and outside the second concave portion 232. The second through hole 236 and the fourth through hole 238 which are arranged on the other diagonal line are provided in an area that is outside the first concave portion 231 and inside the second concave portion 232.

The first seal member 240 is provided between the anode 252 of the MEA 250 and the separator 230, and has a large hole 241 which coincides with a contour of the first concave portion 231, and two small holes 246, 248 which coincide with the second through holes 236 and the fourth through hole 238 respectively. The second seal member 260 is provided between the cathode 253 of the MEA 250 and the separator 230, and has a large hole 261 which coincides with an contour of the second concave portion 232 and two small holes 265, 267 which coincide with the first through hole 235 and the third through hole 237 respectively.

Inside the FC stack 20, the fuel gas supply manifold M1, the fuel gas release manifold M3, the oxidizing gas supply manifold M2 and the oxidizing gas release manifold M4 are formed.

The cylindrical valve 21, which can be rotated around the axis, is inserted into a cylindrical cavity which is formed by stacking the first through hole 235 of the separator 230, the large hole 241 of the first seal member 240, and the small hole 265 of the second seal member 260 in the unit cell stacking direction. The cylindrical valve 21 functions as the fuel gas supply manifold M1. In the cylindrical valve 21, a plurality of slit windows 21a is provided along the axial direction, as shown in FIG. 3. When the cylindrical valve 21 is positioned such that each slit window 21a communicates with the first concave portion 231 of each of the unit cells 210, distribution of fuel gas to each of the unit cells 210 is permitted (this position is referred to as a permission position). Meanwhile, when the cylindrical valve 21 is positioned such that the slit window 21a cannot communicate with the first concave portion 231 of each of the unit cells 210, distribution of fuel gas to each of the unit cells 210 is prohibited (this position is referred to as a prohibition position). The cylindrical valve 21 is positioned at the permission position or the prohibition position by the motor 22 (refer to FIG. 1) which is attached to the end plate 216 of the FC stack 20. Then, the fuel gas which is supplied to the cylindrical valve 21 that is positioned at the permission position passes through the fuel gas passage 233 provided in the first concave portion 231 of each of the unit cells 210, reaches the fuel gas release manifold M3 which is formed by stacking the third through hole 237 of the separator 230, the large hole 241 of the first seal member 240, and the small hole 267 of the second seal member 260, and is released to the outside from the fuel gas release manifold M3.

The oxidizing gas supply manifold M2 is formed by stacking the second through hole 286 of the separator 230, the large hole 261 of the second seal member 260, and the small hole 246 of the first seal member 240 in the unit cell stacking direction. The oxidizing gas which is supplied to the oxidizing gas supply manifold M2 passes through an oxidizing gas passage (not shown) provided in the second concave portion 232, reaches the oxidizing gas release manifold M4 which is formed by stacking the fourth through hole 238 of the separator 230, the large hole 261 of the second seal member 60, and the small hole 248 of the first seal member 240 in the unit cell stacking direction, and is released to the outside from the oxidizing gas release manifold M4.

Figure 4:
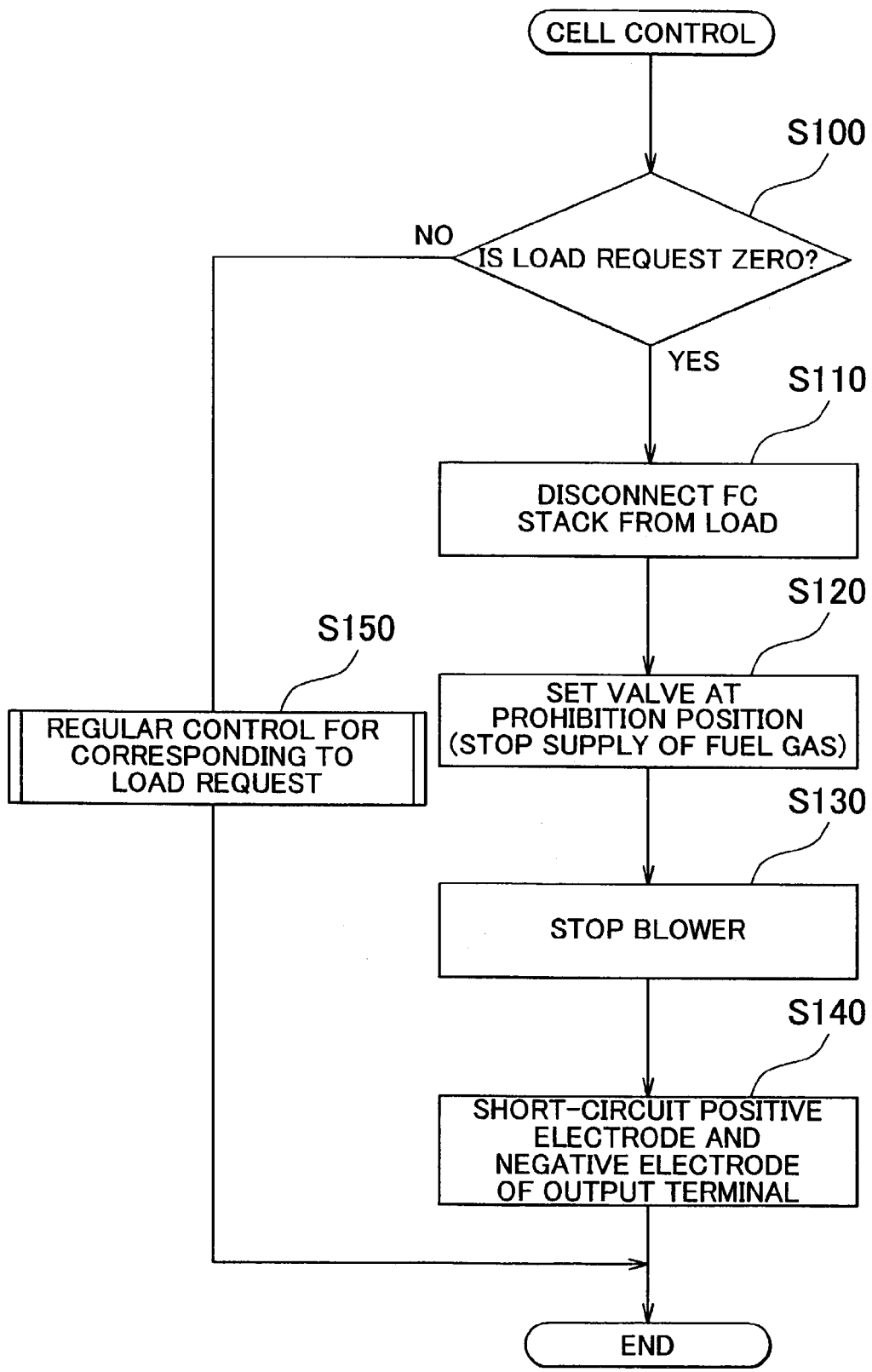
FIG. 4 is a flowchart showing a control process of the fuel cell system according to an exemplary embodiment of the invention.

Next, the operation of the fuel cell system 10 according to the embodiment will be described. FIG. 4 is a flowchart showing a cell control process. The CPU 51 of the control device 50 reads a cell control program from the ROM 52 at each predetermined time so as to perform the cell control process. When the cell control process is started, the CPU 51 initially determines whether the load request which is input from another control device is zero (step S100). When the load request is not zero, the CPU 51 performs regular control corresponding to a load request (step S150), afterwhich the cell control process ends. In the regular control corresponding to a load request, the output terminals 25, 26 of the FC stack 20 are connected with the load 60 by the first interrupter 30, and the short-circuiting switch 41 is opened by the second interrupter 40 such that the output terminals 25, 26 of the FC stack 20 are not short-circuited, and the cylindrical valve 21 is positioned at the permission position by the motor 22. When the fuel gas and the oxidizing gas are supplied to the FC stack 20 by the amount that corresponds to the load request, electric power which corresponds to the supply amounts is supplied to the load 60. Since the humidified oxidizing gas is supplied to the FC stack 20, the electrolyte membrane 251 is continuously humid, and good proton conductivity can be maintained.

Meanwhile, when the load request is zero in step S100, in order to realize OCV (Open Circuit Voltage) state, the output terminals 25, 26 of the FC stack 20 are disconnected from the load 60 by opening the first interrupter 30 which has been closed (step S110). Next, the cylindrical valve 21 is moved from the permission position and is positioned at the prohibition position by driving the motor 22 such that the inlet of the first concave portion 231, that is, the portion in the vicinity of the inlet of the fuel gas passage 233 is closed (step S120), and the driving of the blower 11 is stopped (step S130). Thus, the amount of the hydrogen gas which remains in the FC stack 20 at the OCV time becomes equivalent to the capacity of the first concave portion 231 (approximately the capacity of the fuel gas passage 233). Also, the supply of the oxidizing gas is stopped. Then, the short-circuiting switch 41 is closed by the second interrupter 40 such that the output terminals 25, 26 of the FC stack 20 are short-circuited through a resistor 42 (step S140). At this time, the hydrogen gas whose amount is equivalent to the capacity of the first concave portion 231 is consumed, which generates corresponding heat. Due to this heat generation, each of the unit cells 210 becomes relatively dry, which is preferable for preventing cross leak of the hydrogen. The fact that the load request is zero signifies that, for example, in the case of an electric vehicle, the vehicle is in the idling state or the like. When the secondary battery is charged, the fact that the load request is zero signifies that the battery is fully charged.

In the fuel cell system 10 according to the embodiment, which has been described in detail, when the output terminals 25, 26 of the FC stack 20 are disconnected from the load 60, the hydrogen in each of the unit cells 210 is consumed by short-circuiting the output terminals 25, 26 of the FC stack 20 after distribution of the fuel gas to the fuel gas passage 233 of each of the unit cells 210 is prohibited in the fuel gas supply manifold M1. Accordingly, cross leak of hydrogen can be prevented. Also, distribution of the fuel gas is stopped in the fuel gas supply manifold M1, unlike the conventional method in which the supply of the fuel gas is stopped in the gas piping which is provided outside the stack. Accordingly, the amount of the hydrogen which remains after distribution of the fuel gas is stopped is smaller, the amount of the hydrogen which is consumed when the output terminal 25, 26 are short-circuited is smaller, and the amount of heat generation is smaller, as compared with the conventional method. Thus, deterioration of durability due to heat generated at the time of short-circuit can be suppressed, and unnecessary consumption of large amount of hydrogen can be avoided. Therefore, cross leak can be prevented when the output terminals 25, 26 of the FC stack 20 are disconnected from the load 60, and deterioration of fuel economy can be avoided.

Also, each of the unit cells 210 becomes relatively dry due to heat which is generated when the output terminals 25, 26 of the FC stack 20 are short-circuited, which is advantageous for the prevention of cross leak.

Further, since the cylindrical valve 21 performs opening and closing in the vicinity of the inlet of the fuel gas passage 233 of each of the unit cells 210, the amount of the hydrogen which is consumed at the time of short-circuit can be further reduced, and heat which is generated at the time of short-circuit is further reduced, which is advantageous for the prevention of deterioration of fuel economy.

It is apparent that the invention is not limited to the above-mentioned embodiment, and that the invention may be realized in various other embodiments within the scope of the invention.

Figure 5:
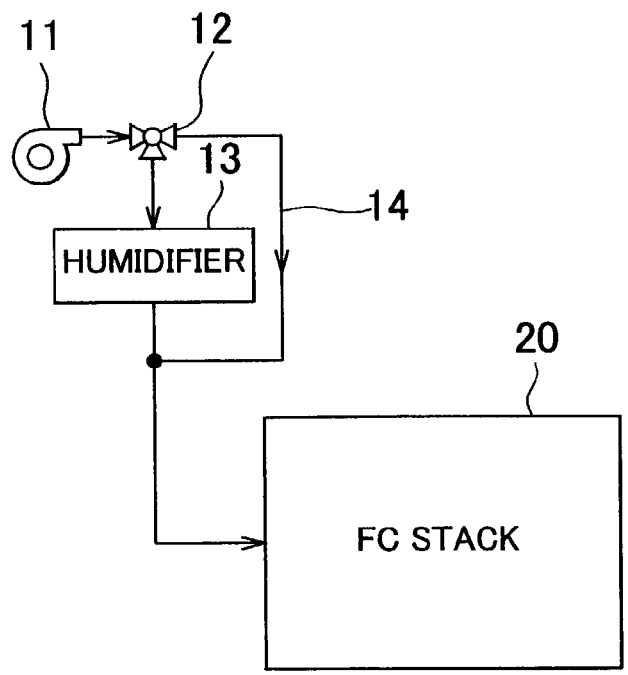
FIG. 5 is a block diagram showing a vicinity of a blower, as a first modified example of the embodiment.

For example, in the above-mentioned embodiment, the oxidizing gas which is humidified by the humidifier 13 is supplied from the blower 11 to the FC stack 20. However, as shown in FIG. 5, a three-way valve 12 may be provided between the blower 11 and the humidifier 13 such that unhumidified oxidizing gas is supplied from the three-way valve 12 to the FC stack 20 through a bypass route 14 which bypasses the humidifier 13. At the time of regular control corresponding to a load request, the control device 50 may control the three-way valve 12 such that the oxidizing gas is supplied from the blower 11 to the FC stack 20 through the humidifier 13. Meanwhile, at the OCV time, the control device 50 may control the three-way valve 12 such that the oxidizing gas is supplied from the blower 11 to the FC stack 20 through the bypass route 14. In this manner, at the OCV time, dry oxidizing gas is supplied to the FC stack 20. Thus, since the water which is generated at the cathode by electrochemical reaction is efficiently released by the dry oxidizing gas, each of the unit cells 210 becomes dry, and cross leak becomes difficult to cause.

Figure 6:
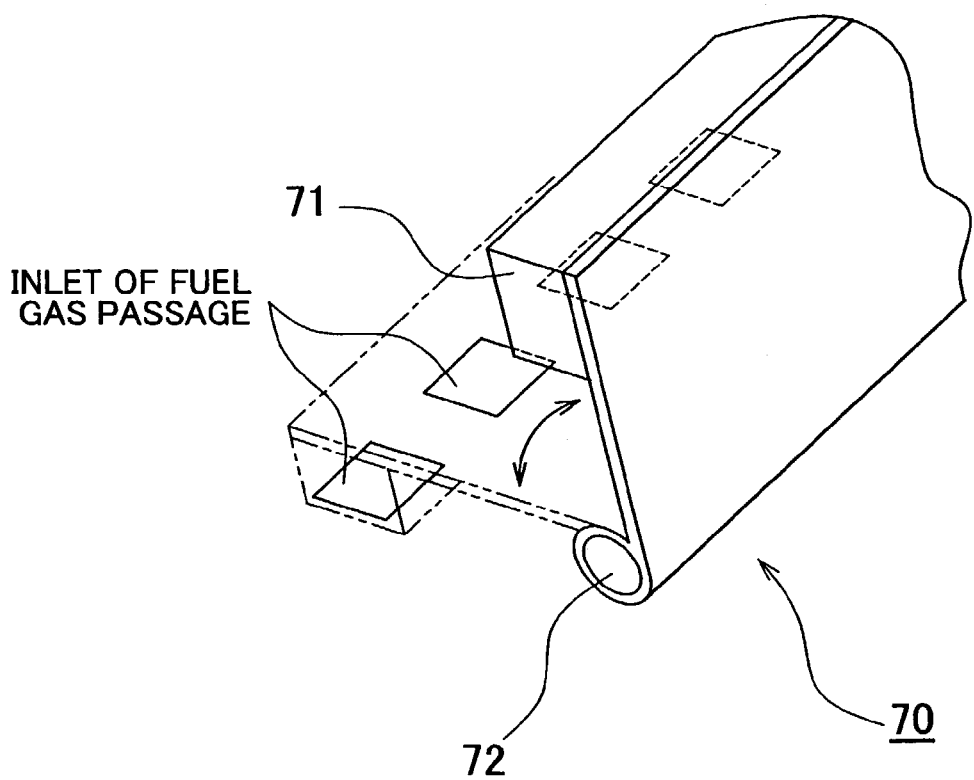
FIG. 6 is an explanatory diagram showing switching means, as a second modified example of the embodiment.

Also, in the above-mentioned embodiment, the cylindrical valve 21 is employed as switching means. However, as shown in FIG. 6, a switching mechanism 70 which has a lid portion 71 that can close an inlet of the fuel gas passage at the tip thereof, and has a rotational shaft 72 at the base end may be employed. At the time of regular control corresponding to a load request, the lid portion 71 may open the inlet of the fuel gas passage of each of the unit cells. Meanwhile, at the OCV time, the inlet of the fuel gas passage of each of the unit cells may be closed by the lid portion 71 by rotating a rotational shaft 72. In this case, the lid portion 71 needs to be formed of resin, rubber or the like. Alternatively, as disclosed in Japanese Patent Laid-Open Publication No. 9-312168, a slide slit may be employed. At the time of regular control corresponding to a load request, the slit may open the inlet of the fuel gas passage of each of the unit cells. Meanwhile, at the OCV time, the inlet of the fuel gas passage of each of the unit cells may be closed by sliding the slit.

Further, in place of the motor 22 which is employed in the above-mentioned embodiment, an actuator which is driven by air pressure or hydraulic pressure may be employed. Furthermore, a ground switch may be provided between the short-circuiting switch 41 of the second interrupter 40 and the output terminal 26 in the above-mentioned embodiment such that the ground switch is opened and closed in accordance with opening and closing of the short-circuiting switch 41.

When the load request is zero, the control device of the fuel cell system disconnects both of the output terminals of the FC stack from the load (step S110). Next, the control device performs closing in the vicinity of the inlet of the fuel gas passage (step S120), and stops the supply of the oxidizing gas (step S130). Thus, the amount of the hydrogen gas which remains in the FC stack at the OCV time becomes approximately equivalent to the capacity of the fuel gas passage. Then, both of the output terminals of the FC stack are short-circuited (step S140). Since the remaining hydrogen gas is consumed at this time, cross leak of the hydrogen is not caused thereafter. Also, although heat is generated at the time of short-circuit, the amount of remaining hydrogen gas is smaller, as compared with the conventional method. Accordingly, since the amount of generated heat is small, a negative effect can be avoided.

While the invention has been described with reference to exemplary embodiments thereof, it is to be understood that the invention is not limited to the exemplary embodiments or constructions. To the contrary, the invention is intended to cover various elements of the exemplary embodiments are shown in various combinations and configurations, which are exemplary, other combinations and configurations, including more, less or only a single element, are also within the spirit and scope of the invention.

What is claimed is:

1. A fuel cell system in which fuel gas and oxidizing gas are supplied to a fuel cell stack that is formed by stacking a plurality of unit cells, and power generation is performed by electrochemical reaction between the fuel gas and the oxidizing gas, comprising:
    a fuel gas supply manifold which is extended in a unit cell stacking direction and which distributes the fuel gas to a fuel gas passage of each of the unit cells;
    a switching device which is provided inside the fuel gas supply manifold, and which switches between permission and prohibition of distribution of the fuel gas to the fuel gas passage of each of the unit cells;
    a load disconnect device which disconnects an output terminal of the stack from a load;
    a short-circuit device which short-circuits a positive electrode and a negative electrode of the output terminal of the stack;
    a control device which short-circuits the positive electrode and the negative electrode of the output terminal by the short-circuit device after distribution of the fuel gas to the fuel gas passage of each of the unit cells is prohibited by the switching device when the output terminal is disconnected from the load by the load disconnect device;
    a cylindrical valve which is extended in a unit cell stacking direction, and which has an opening port at a position at which the opening port can communicate with the fuel gas passage of each of the unit cells; and
    a driving device which permits distribution of the fuel gas to the fuel gas passage of each of the unit cells by positioning the cylindrical valve such that the opening port communicates with the fuel gas passage of each of the unit cells, and which prohibits distribution of the fuel gas to the fuel gas passage of each of the unit cells by positioning the cylindrical valve such that the opening port does not communicate with the fuel gas passage of each of the unit cells, wherein the cylindrical valve functions as the fuel gas supply manifold, and the cylindrical valve and the driving device function as the switching device.

2. The fuel cell system according to claim 1, further comprising:
    a drying device which dries each of the unit cells, wherein the control device dries each of the unit cells by the drying device, and short-circuits the positive electrode and the negative electrode of the output terminal by the short-circuit device after distribution of the fuel gas to the fuel gas passage of each of the unit cells is prohibited by the switching device when the output terminal is disconnected from the load by the load disconnect device.

3. The fuel cell system according to claim 2, wherein the drying device supplies dry oxidizing gas to the stack.

4. The fuel cell system according to claim 3, wherein the switching device performs opening and closing in a vicinity of an inlet of the fuel gas passage of each of the unit cells.

5. The fuel cell system according to claim 2, wherein the switching device performs opening and closing in the vicinity of an inlet of the fuel gas passage of each of the unit cells.

6. The fuel cell system according to claim 5, further comprising:
    a cylindrical valve which is extended in the unit cell stacking direction, and which has an opening port at a position at which the opening port can communicate with the fuel gas passage of each of the unit cells; and
    a driving device which permits distribution of the fuel gas to the fuel gas passage of each of the unit cells by positioning the cylindrical valve such that the opening port communicates with the fuel gas passage of each of the unit cells, and which prohibits distribution of the fuel gas to the fuel gas passage of each of the unit cells by positioning the cylindrical valve such that the opening port does not communicate with the fuel gas passage of each of the unit cells, wherein the cylindrical valve functions as the fuel gas supply manifold, and the cylindrical valve and the driving device function as the switching device.

7. The fuel cell system according to claim 1, wherein the switching device performs opening and closing in a vicinity of an inlet of the fuel gas passage of each of the unit cells.

8. The fuel cell system according to claim 7, further comprising:
    a cylindrical valve which is extended in the unit cell stacking direction, and which has an opening port at a position at which the opening port can communicate with the fuel gas passage of each of the unit cells; and
    a driving device which permits distribution of the fuel gas to the fuel gas passage of each of the unit cells by positioning the cylindrical valve such that the opening port communicates with the fuel gas passage of each of the unit cells, and which prohibits distribution of the fuel gas to the fuel gas passage of each of the unit cells by positioning the cylindrical valve such that the opening port does not communicate with the fuel gas passage of each of the unit cells, wherein the cylindrical valve functions as the fuel gas supply manifold, and the cylindrical valve and the driving device function as the switching device.

9. The fuel cell system according to claim 1, further comprising:
    a cylindrical valve which is extended in the unit cell stacking direction, and which has an opening port at a position at which the opening port can communicate with the fuel gas passage of each of the unit cells; and a driving device which permits distribution of the fuel gas to the fuel gas passage of each of the unit cells by positioning the cylindrical valve such that the opening port communicates with the fuel gas passage of each of the unit cells, and which prohibits distribution of the fuel gas to the fuel gas passage of each of the unit cells by positioning the cylindrical valve such that the opening port does not communicate with the fuel gas passage of each of the unit cells, wherein the cylindrical valve functions as the fuel gas supply manifold, and the cylindrical valve and the driving device function as the switching device.

10. A control method of a fuel cell system in which fuel gas and oxidizing gas are supplied to a fuel cell stack that is formed by stacking a plurality of unit cells, and power generation is performed by electrochemical reaction between the fuel gas and the oxidizing gas, comprising the following steps of:
providing a switching device inside a fuel gas supply manifold of the fuel cell system and switching between permission and prohibition of distribution of the fuel gas to a fuel gas passage of each of the unit cells;
prohibiting distribution of the fuel gas to the fuel gas passage of each of the unit cells in the fuel gas supply manifold which is extended in a unit cell stacking direction when an output terminal of the stack is disconnected from a load,
short-circuiting a positive electrode and a negative electrode of the output terminal after distribution of the fuel gas is prohibited; and
drying each of the unit cells when the output terminal of the stack is disconnected from the load.

11. The control method of the fuel cell system according to claim 10, wherein each of the unit cells is dried by dry oxidizing gas.

12. The control method of the fuel cell system according to claim 11, wherein when the output terminal of the stack is connected with the load, the fuel gas is humidified, and when the output terminal of the stack is disconnected from the load, dry oxidizing gas is supplied to the fuel gas passage.

13. The control method of the fuel cell system according to claim 12, wherein when distribution of the fuel gas to the fuel gas passage is prohibited, the distribution is prohibited in a vicinity of an inlet of the fuel gas passage.

14. The control method of the fuel cell system according to claim 11, wherein when distribution of the fuel gas to the fuel gas passage is prohibited, the distribution is prohibited in a vicinity of an inlet of the fuel gas passage.

15. The control method of the fuel cell system according to claim 10, wherein when the output terminal of the stack is connected with the load, the fuel gas is humidified, and when the output terminal of the stack is disconnected from the load, dry oxidizing gas is supplied to the fuel gas passage.

16. The control method of the fuel cell system according to claim 15, wherein when distribution of the fuel gas to the fuel gas passage is prohibited, the distribution is prohibited in a vicinity of an inlet of the fuel gas passage.

17. The control method of the fuel cell system according to claim 10, wherein when distribution of the fuel gas to the fuel gas passage is prohibited, the distribution is prohibited in a vicinity of an inlet of the fuel gas passage.

18. The control method of the fuel cell system according to claim 10, wherein when distribution of the fuel gas to the fuel gas passage is prohibited, the distribution is prohibited in a vicinity of an inlet of the fuel gas passage.

* * * * *